United States Patent
LeCrone et al.

(10) Patent No.: US 6,341,329 B1
(45) Date of Patent: Jan. 22, 2002

(54) VIRTUAL TAPE SYSTEM

(75) Inventors: Douglas E. LeCrone, Foxborough, MA (US); Shai Hess, Od Asharon; Elcana Cohen, Tel Aviv, both of (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/501,509

(22) Filed: Feb. 9, 2000

Related U.S. Application Data

(63) Continuation of application No. 09/053,964, filed on Apr. 2, 1998, now Pat. No. 6,070,224.

(51) Int. Cl.[7] .............................................. G06F 12/08
(52) U.S. Cl. ........................................ 711/112; 703/24
(58) Field of Search ............................ 711/4, 111–112, 711/114; 703/24, 26–27; 710/65

(56) References Cited

U.S. PATENT DOCUMENTS

| | | | |
|---|---|---|---|
| 4,775,969 A | 10/1988 | Osterlund ........................ 7/53 |
| 4,787,031 A | 11/1988 | Karger et al. ................ 709/100 |
| 5,239,647 A | 8/1993 | Anglin et al. ................ 455/426 |
| 5,297,124 A | 3/1994 | Plotkin et al. ................. 369/32 |
| 5,438,674 A | * 8/1995 | Keele et al. ..................... 711/4 |
| 5,455,926 A | 10/1995 | Keele et al. ..................... 711/4 |
| 5,475,834 A | 12/1995 | Anglin et al. ................ 707/203 |
| 5,506,986 A | 4/1996 | Healy .......................... 707/204 |
| 5,544,347 A | 8/1996 | Yanai et al. ................. 711/162 |
| 5,548,783 A | * 8/1996 | Jones et al. .................... 710/16 |
| 5,673,418 A | * 9/1997 | Stonier et al. ................. 703/23 |

* cited by examiner

*Primary Examiner*—Matthew Kim
*Assistant Examiner*—Denise Tran
(74) *Attorney, Agent, or Firm*—George A. Herbster

(57) ABSTRACT

A method and apparatus for emulating a magnetic tape storage device with a conventional, unmodified magnetic disk storage device. I/O output requests for the emulated magnetic tape storage device are intercepted to determine whether they involve a virtual tape resource that comprises a magnetic disk storage device. Tape requests to such a resource are converted into one or more conventional magnetic disk storage requests to effect an analogous operation.

20 Claims, 8 Drawing Sheets

VIRTUAL TAPE SYSTEM

This application is a continuation of application Ser. No. 09/053,964, filed Apr. 2, 1998 now U.S. Pat. No. 6,070,224 granted May 30, 2000.

BACKGROUND OF THE INVENTION

1. Field of the Invention

This invention generally relates to storage devices for use in data processing systems and more particularly to a system that enables a magnetic disk storage device to emulate a magnetic tape storage device.

2. Description of Related Art

Data centers that process and maintain large quantities of data generally include two types of mass storage devices, namely: magnetic disk storage devices and magnetic tape storage devices. Both types of mass storage devices typically operate in large-scale, multiple-processor systems. These systems further include sophisticated operating systems for controlling various resources connected to one or more central processors. The Multiple Virtual System of IBM (commonly called "MVS") is one such system.

Data centers operate with different configurations that may include certain magnetic disk storage devices organized as primary storage devices. Other magnetic disk storage devices may act as mirrors or may act as redundant storage devices to provide instantaneous backups. In a redundant configuration, data overwritten to the primary storage is immediately overwritten to the redundant magnetic disk storage device so no historical record is maintained of different versions of a system.

Typically magnetic disk storage devices are used for "active" data because access to specific data in a magnetic disk storage device is more rapid than access to data in a magnetic storage device. Magnetic tape storage devices typically store archived or back up data primarily because the perceived cost of magnetic tape storage is significantly lower than the perceived cost of magnetic disk storage.

Magnetic tape storage devices are devices of choice for generating historical backups. With the perceived costs of different media, tape storage has represented the only practical approach to providing such historical backups. Thus, in the case of a program development, for example, each revision of the program may be transferred to magnetic tape leaving only the most current version of the program on a magnetic disk storage device.

Transfers to magnetic tape storage generally occur in response to the execution of a batch file that identifies one or more files or volumes for backup to a particular magnetic tape storage device as a resource. A host processor runs the batch file to transfer the named file or files from the primary disk storage device to the secondary tape storage device. In a second approach the age of files on a primary storage device is ascertained. "Older" files are transferred to the tape. Unfortunately as a particular batch job must make a transfer to one tape, tape utilization often times is poor. That is the data stored in a tape may occupy only a few percent of the available storage space in the tape. Moreover associated testing and transfer operations require host processing cycles that can degrade host performance for other applications.

In another approach a second magnetic disk storage device connects to the host. It generally will have about fifteen percent of the total capacity of the primary magnetic disk storage device. Aged data is swept from the primary magnetic disk storage device to the second magnetic disk storage device. This process is more efficient than the above-identified tape transfer process. As space on the second magnetic disk storage device is needed, the oldest data is transferred to the magnetic tape storage device. Although the process can improve performance somewhat, tape utilization still is generally poor. That is, it has been found that about one third of the applications will nearly fully utilize a tape, about one third will provide intermediate utilization and one third will under utilize the tape. For example, it is not unusual to find only a 5 megabyte file on a 1 to 2 gigabyte tape.

When such under utilization occurs, the real cost for tape becomes significantly higher. That is, the total cost of the media associated with the under utilized tape increases the "per-byte" cost of actual storage. If the number of tape drives in a system is not changed, increasing the number of tapes requires tape mounting and demounting that might otherwise be avoided if the tapes were utilized fully. The alternative is to add more tape drives, but that increases the floor space required for the data center.

Tape mount management or similar programs can operate with special hardware configurations that include disk buffers to accumulate data from jobs for subsequent transfer to tapes.

Buffer capacity in such systems is limited. While this approach can also improve tape utilization, the system still relies on tapes and the need for tape farms or other physical tape drives.

In still another approach management software collects data to be transferred to magnetic tape. Then the management software transfers all the data from different jobs, commonly "data sets", onto a single magnetic tape. Initially this improves magnetic tape utilization. However, as known, data sets often are stored with a finite life, and a single tape will store data sets with lives ranging from a few days to a few months. As different data sets expire, tape utilization reduces. To maintain high levels of utilization, the tapes are recycled regularly to consolidate data sets on the magnetic tapes. This recycling process is extremely time consuming especially in data processing systems with hundreds or thousands of magnetic tapes.

Consequently the total costs for storing data on magnetic tape storage devices can be significantly higher than the perceived cost. Simultaneously with the increased need for tape storage, the cost of storage on magnetic disk storage devices is falling. Comparable transfer rates, even during data streaming, are achievable in both the magnetic disk storage devices and magnetic tape storage devices. Moreover the ability to dynamically relocate data on a disk device provides an opportunity to utilize space very effectively and achieve high levels of space utilization.

Several proposals have been made to use magnetic disk storage devices as magnetic tape storage devices, that is, to emulate a magnetic tape storage device or operate a magnetic disk storage device as a virtual tape device. However, such proposals require new special-purpose hardware and software modifications such that emulation is not transparent to the user. Consequently the emulation does not act as a true virtual device.

SUMMARY

Therefore it is an object of this invention to provide a magnetic disk storage device that operates as a virtual tape device.

Another object of this invention is to provide a virtual tape device that is transparent to a user.

Still another object of this invention is to provide a virtual tape device using magnetic disk storage that is flexible to implement.

Yet another object of this invention is to operate a magnetic disk storage device in response to tape commands without modifying the magnetic disk storage devices.

Still yet another object of this invention is to operate a magnetic disk storage device in response to tape commands from a user application without requiring any modification of the program by the user.

In accordance with this invention a first data storage device, such as a magnetic tape storage device, responds to individual first requests in a first set of input-output requests. A second data storage device, such as a magnetic disk storage device, responds to individual second requests in a second set of input-output requests. A host computer issues first and second requests. Each time the host computer issues a first request, a conversion is made to at least one request in the second set thereby to define an analogous operation at the second data storage device. The resulting request or requests in the second set transfer to the second data storage device to effect an analogous operation. When the operation is completed, signals are generated for that operation to be returned to the host computer. Consequently the second data storage device acts as a virtual first data device.

In accordance with another aspect of this invention, a magnetic disk storage device acts as a virtual tape device and responds to tape requests from a user program in user address space of a main memory. The main memory includes a pointer to a standard input-output module that effects input-output operations with various devices. The virtual tape device operation is achieved by establishing a virtual tape program address space in the main memory that includes a server program with a command converter, an index and a second input-output module. When this program is initiated, the contents of a pointer to the standard input-output module are changed to identify the second input-output module. Tape requests for the virtual tape device are converted to disk requests in the command converter and effect an operation defined by the disk request. Status is generated and returned to the user program upon completion of the operation. An index is updated to maintain current correspondences between virtual tape locations and magnetic disk locations. The standard input-output module processes other requests.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
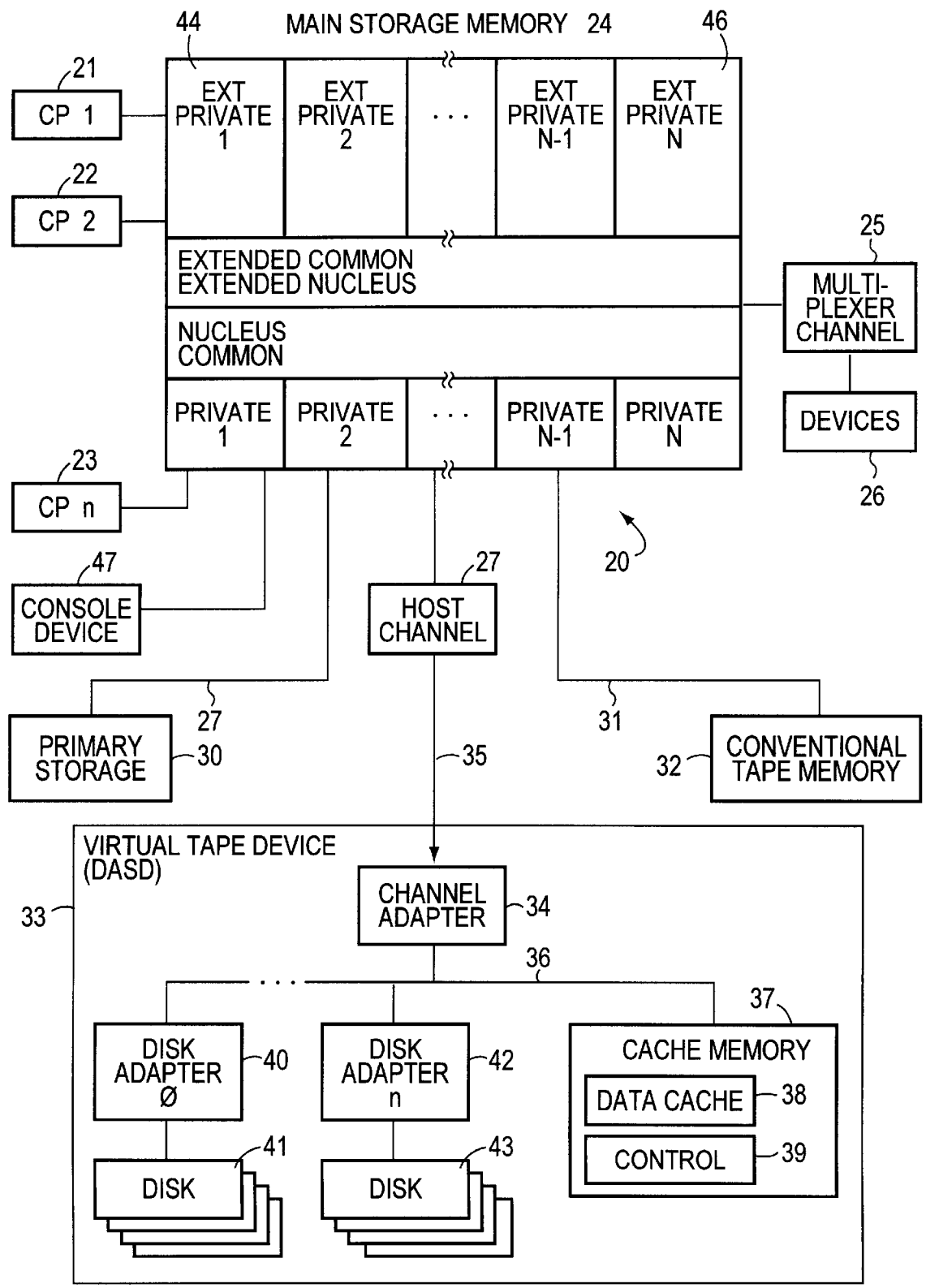
FIG. 1 depicts a data processing system incorporating this invention.

FIG. 1 depicts a data processing system or host 20 which, for purposes of explaining this invention, is shown as an IBM based system. The system 20 comprises multiple central processors (CP) identified as CP1–21, CP2–22 and CPn where n is the maximum number of central processors that comprise the data processing system 20. Each central processor connects to a main storage unit 24. In an IBM MVS environment the main storage unit 24 is divided into a number of sections that, as known, include private, common, nucleus, extended nucleus, extended common and extended private storage areas.

A channel 25 provides a communications path for devices 26 such as printers, local terminals and the like. Another channel 27 establishes a communications path to a primary storage unit, such as a magnetic disk storage unit. Still another channel 31 establishes a communications path with a conventional tape storage system 32. Such systems and their operations, including the methods by which data is exchanged, are, as previously described, well known in the art.

A virtual tape device 33 in accordance with this invention is constituted by a conventional, unmodified magnetic disk storage device such as described in U.S. Pat. No. 5,206,939 of Moshe Yanai et al. for a System and Method for Disk Mapping and Data Retrieval, assigned to the same assignee as this invention and such as is available as a Symmetrix Series 5500 integrated cache disk array. The basic components of such a disk array include a channel or host adapter 34 that connects to a channel 35 from the host 20. A bus 36 connects the channel adapter 34 to a cache memory 37. The cache memory 37 includes a data cache 38 and a control 39. A disk adapter 40 connects to the bus 36 and to a plurality of disks 41; another disk adapter 42, to a plurality of disks 43. A single physical integrated cache disk array 33 such as shown in FIG. 1 comprises a plurality of physical disk drives or disks that are organized into one or more logical volumes.

In the Symmetrix Series 5500 integrated cache disk array, input/output operations include reading and writing operations. Writing operations produce a transfer into the data cache 38. Control programs in the control 39 effect the transfer from the data cache 38 to a logical volume on one of the pluralities of disks 41 and 43. Reading operations are accomplished by first determining whether the requested data is available in the data cache 38. If it is not, the requested information transfers from a logical volume on one of the pluralities of disks 41 and 43 to the data cache 38 for subsequent transfer to the main storage unit 24.

In accordance with conventional procedures in MVS systems, the main storage unit 24 can be considered as being divided into private, common, nucleus, extended nucleus, and extended private areas. For purposes of this invention, it is assumed that the main storage memory 24 will contain a user program or application 44 in certain address space and an EMCSVT program 46 in other address space.

Figure 2:
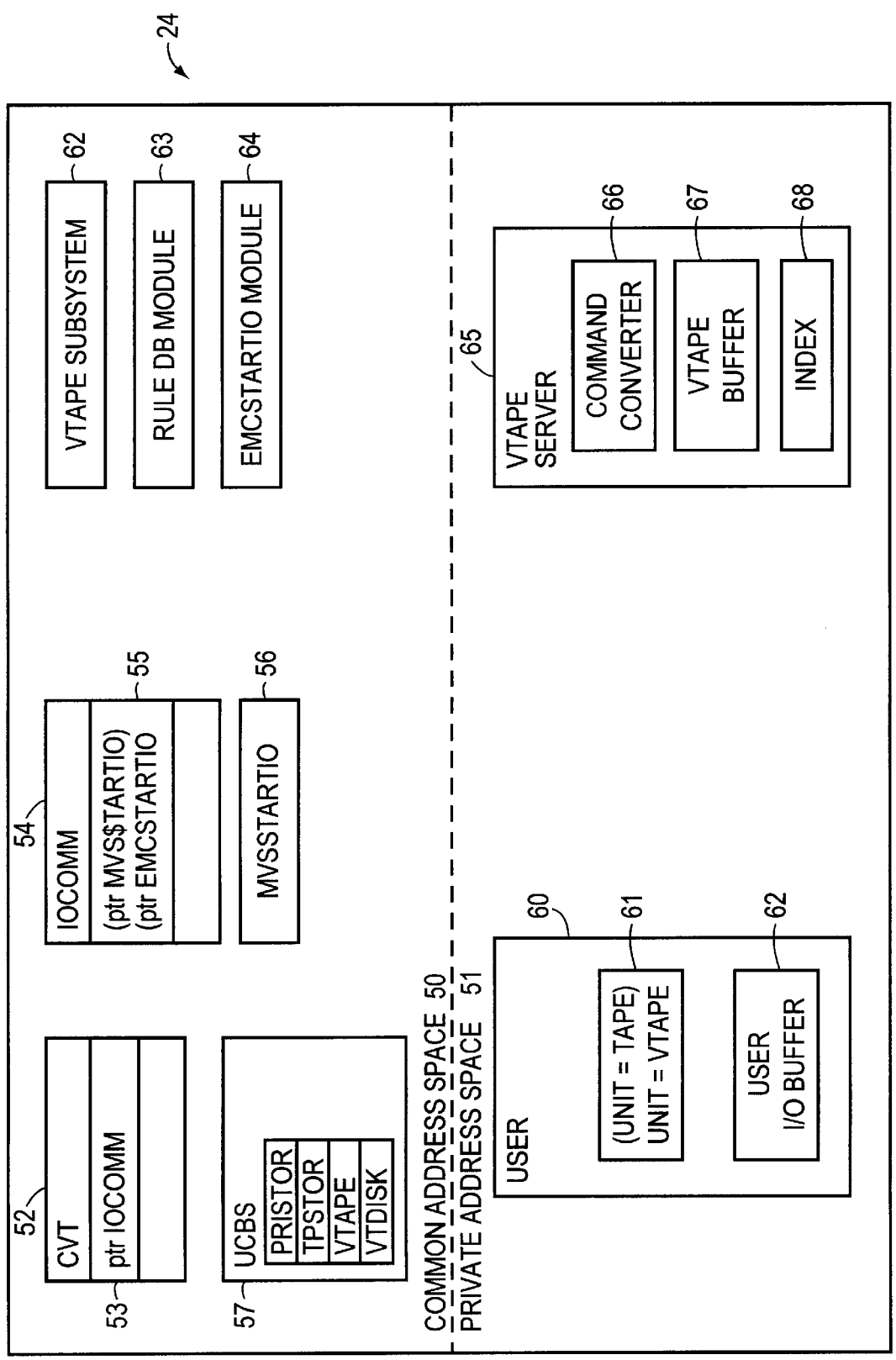
FIG. 2 depicts elements relevant to this invention included in a main storage unit of the system of FIG. 1.

FIG. 2 depicts particular portions of the address space in the main storage unit 24 of FIG. 1 that are important to an understanding of this invention. Specifically FIG. 2 depicts a common area 50 and a private area 51. Within the common area 50 the MVS operating system includes a communications vector table (CVT) 52. of particular importance to this invention is a ptrIOCOMM pointer 53 that defines a starting address for an IOCOMM table 54. The IOCOMM block 54 normally contains a ptrSTARTIO pointer 55 that identifies the location of an MVSSTARTIO module 56. The mnemonic MVSSTARTIO is used to distinguish the conventional STARTIO module provided in MVS from an EMCSTARTIO module described later. The common area additionally includes unit control blocks (UCB) 57 that define various resources in the system such as a PRISTOR UCB and a TPSTOR UCB associated respectively with the primary storage unit 30 and conventional tape memory 32 shown in FIG. 1.

FIG. 2 also depicts a user program 60 that represents the combination of the address spaces 44 and 45 in FIG. 1. Of particular interest with respect to this invention are a unit identification block 61 and a user I/O buffer 62. In normal MVS operations if an I/O request identifies a resource, such as the primary storage device 30, the user program initiates a transfer by means of the ptrIOCOMM pointer 53. The MVS system identifies an appropriate unit control block 57, the PRISTOR UCB in the case of the primary storage device 36, and transfers control to the MVSSTARTIO block 56 identified by the ptrSTARTIO pointer 55. The MVSSTARTIO module 56 initiates the transfer by processing appropriate Channel Control Words for effecting the transfer. When the operation is complete, the MVS system posts status information to the user application program 60 that indicates the success of the operation. If any error condition exists, sense data will also be transferred to identify the nature of the error. If the operation involves a data transfer, the user application program 60 identifies a user I/O buffer 62 as the storage location to which or from which data should be transferred. All the foregoing procedures are conventional MVS operating procedures that are well known in the art.

When a conventional magnetic disk storage device is to be added for operation as a virtual tape device 33 of FIG. 1, the EMCSVT program 46 in the main storage unit 24 of FIG. 1, defines a number of elements in the common storage area 50 and in the private storage area 51. Specifically the EMCSVT program defines a VTAPE subsystem block 62, a RULE DB module 63 and a EMCSTARTIO module 64 in the common area 50. The private area 51 will contain a VTAPE server 65 which, in one embodiment, incorporates a COMMAND CONVERTER 66, a VTAPE buffer 67 and an INDEX block 68.

Figure 3:
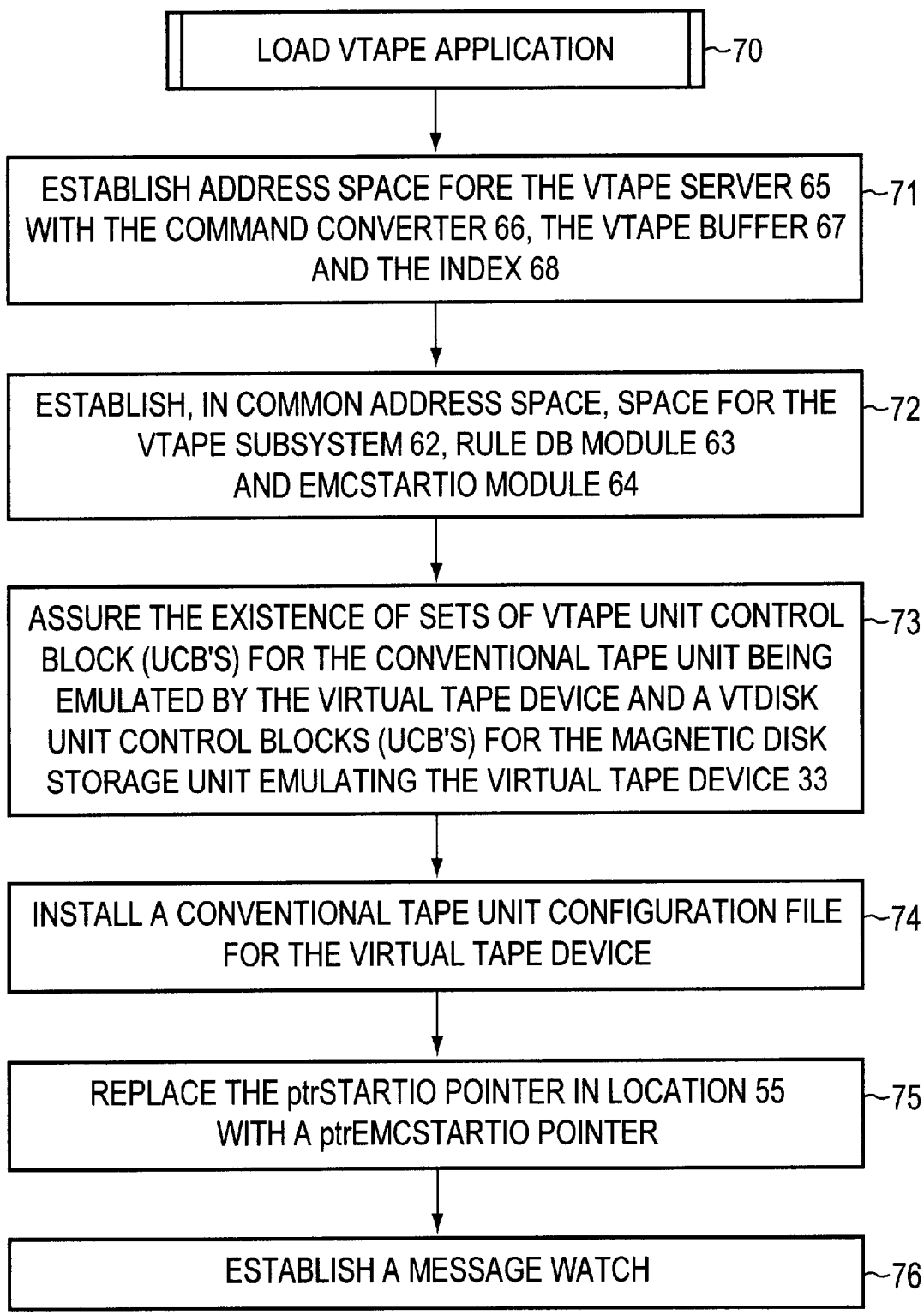
FIG. 3 is a flow diagram that depicts the steps for transferring an application program to the main storage unit in FIG. 1 for implementing this invention.

When it is desired to implement the virtual tape of this invention, the magnetic disk storage device is connected to the system as shown in FIG. 1. A LOAD VTAPE application procedure 70 as depicted in FIG. 3 loads the application. This procedure 70 uses step 71 to establish an address space for the VTAPE server 65, including the command converter 66, the VTAPE buffer 67 and the INDEX block 68. Step 72 establishes space for the VTAPE subsystem 62, the RULE DB module 63 and the EMCSTARTIO module 64 in the common address space.

The virtual tape unit is generally selected to emulate one of a known list of conventional tape units for which the structure of a unit control block (UCB) is known. Moreover, the initialization of a conventional tape unit generally involves generating a set of UCBs. In accordance with this invention step 73 assumes that two sets of one or two unit blocks exist for each virtual tape device. One set corresponds to the UCBs that would exist for the tape unit being emulated; the other set, for the actual magnetic disk storage device 33 that will emulate the tape unit. Duplicate sets of unit control blocks are not necessary. That is, if the data processing system already includes a magnetic tape storage unit of a same type as the selected type of tape unit being emulated, an additional set is not necessary. Similarly if a primary magnetic disk storage system and magnetic disk storage system that constitutes the virtual tape device 33 are of the same type, only one set of UCBs is necessary. Effectively step 73 assures the existence of one set of UCBs assigned to the virtual tape device and one set of UCBs assigned to the magnetic disk storage device that constitutes the virtual tape device.

If not previously included, a conventional tape unit configuration file for the virtual tape device is added to the system in step 74.

Step 75 replaces the ptrMVSSTARTIO pointer in location 55 with a ptrEMCSTARTIO pointer. This action diverts all subsequent input/output requests to the EMCSTARTIO module 64. As will be described in more detail later, the EMCSTARTIO module 64 will either process the request directly or transfer control to the MVSSTARTIO module 56.

Step 76 establishes a message watch. A message watch is a standard MVS operating procedure.

The specific procedures for implementing each of the foregoing steps will be readily apparent to persons of ordinary skill in the art. Moreover the order of the steps is arbitrary although steps 75 and 76 typically will be the last two steps in the procedure of FIG. 3.

Figure 4:
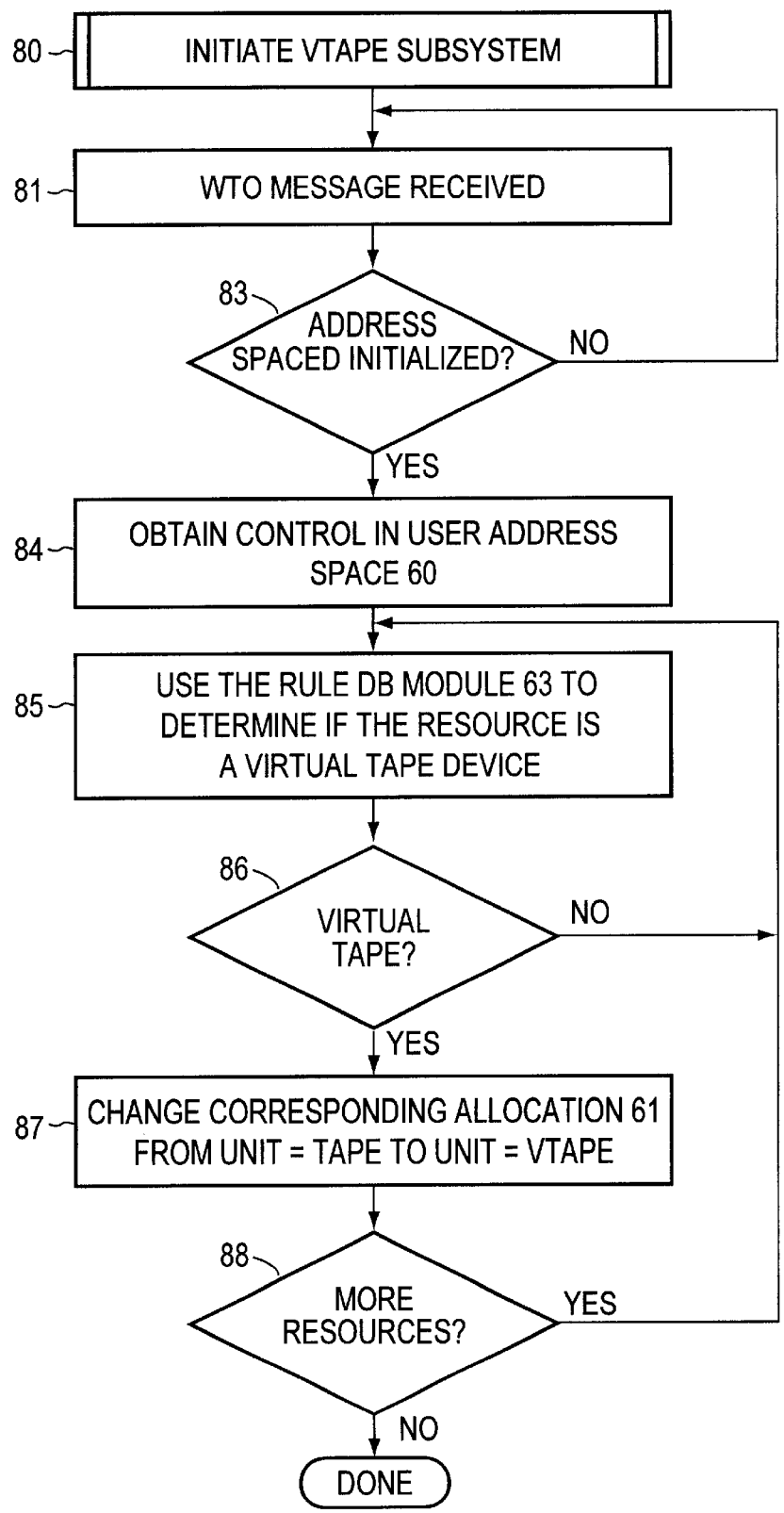
FIG. 4 is a flow chart of the process for initiating the subsystem loaded in FIG. 3.

Once the procedure in FIG. 3 completes, an INITIATE VTAPE SUBSYSTEM module 80 in FIG. 4 operates to perform the message watch function. That is, the system utilizes known procedures for enabling the VTAPE subsystem 62 in FIG. 2 to receive each WTO message transmitted by the MVS system. As known, WTO messages fall into a number of categories including those that indicate a job has been initialized. That is, the message indicates that address space, such as the address space 44 in FIG. 1 or address space 60 in FIG. 2, has been made available for a job. The receipt of such a WTO message causes step 83 to divert control to step 84. For all other WTO message types control returns to step 81 to await a next WTO message.

In step 84, the VTAPE subsystem 62 obtains control over the assigned user address space, such as the user address space 60 in FIG. 2. Step 85 is the first step of an iterative procedure for testing each resource device required by the job to determine if the device identifies a virtual tape device. During this procedure information in the RULE DB module 63 identifies each resource that operates as a virtual tape device 33. The use of rule data bases for analogous uses is also well known in the art.

Jobs in the data processing system typically use JCL statements that include DD statements to identify resources. Each resource can be identified by a data set name (DSN), by a unit number or by a volume-serial (VOLSER) number. To maintain user transparency, the RULE DB module 63 identifies each specific resource by all of its alternate names. Each identification then further indicates whether a DSN, unit number or VOLSER number is stored on a virtual tape device. For example, if a tape request identifies an address by a data set name (DSN), the procedure of step 85 compares the DSN with the list or concordance of each DSN assigned to the virtual tape. If the resource for the DSN has a matching entry, the resource is identified as a virtual tape.

If the RULE DB module 63 identifies a resource as a virtual tape device, step 86 shifts the procedure to step 87 to change the allocation in block 61 of FIG. to indicate that the unit is now a virtual tape, as by changing UNIT=TAPE to UNIT=VTAPE or some other predetermined designation. When all the resources (i.e., all DD statements) have been tested, the system is initialized and prepared to process input-output requests so step 88 transfers control out of INITIATE VTAPE SUBSYSTEM 80 module. Otherwise control passes back to step 85 to identify another resource.

Figure 5:
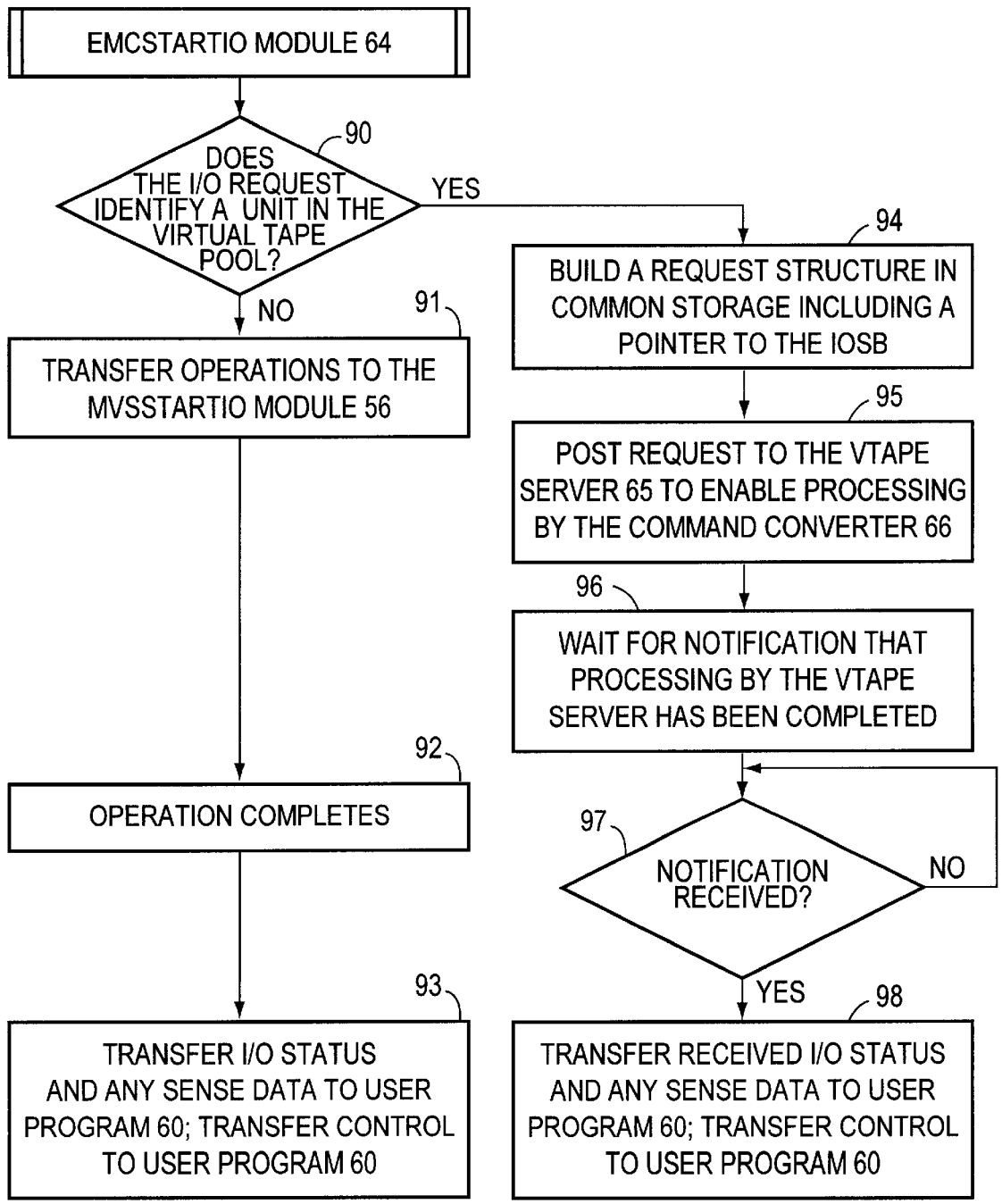
FIG. 5 is a flow diagram that depicts the response to an input-output request for transfer to one of the resources in the system of FIG. 1.

FIG. 5 depicts the EMCSTARTIO module 64 that is invoked in response to each I/O request from an application program, such as the user program in address space 60 in FIG. 2. These are input-output requests in the form of tape commands and constitute first requests from a first set of input-output requests. These first requests are identified as "tape requests" in the following discussion, and the following are representative examples.

1. a LOAD DISPLAY tape request for directing a particular tape to be mounted on a tape drive and to be allocated for use by subsequently generated tape requests;
2. a WRITE TAPE MARK tape request for recording a mark on the tape;
3. BACK and FORWARD SPACE BLOCK tape requests that move a tape backward and forward to a preceding or succeeding block, respectively;
4. BACK or FORWARD SPACE FILE tape request that move a tape backward or forward to the beginning of a preceding or succeeding file;
5. a WRITE tape request for transferring a data block or blocks from a buffer in a user program to an identified tape;
6. a READ tape request for transferring a data block or blocks from an identified tape to a buffer in a user program; and
7. a REWIND UNLOAD tape request that causes the tape to be rewound and a message sent to an operator to remove the tape.

Normally conventional MVS procedures use the ptrIOCOMM pointer 53 of FIG. 2 in the communications vector table 52 to direct a transfer to the location 55 in the IOCOMM table 54. As previously indicated, however, the location 55 now contains the ptrEMCSTARTIO pointer to the EMCSTARTIO module 64, so any input/output request is processed initially by the EMCSTARTIO module 64.

Step 90 in FIG. 5 uses the information in the I/O request and the information in the RULE DB module 63 to determine whether the request identifies a unit in the virtual tape pool. If a virtual tape is not included, step 90 diverts to step 91 that transfers operations to the MVSSTARTIO module 56 to respond to the tape or other request according to conventional MVS procedures. When the conventional operation completes in step 92, an appropriate I/O status is generated in step 93 for transfer to the user program 60. If the I/O status indicates an error, sense data may also be returned. Control then passes back to the user program 60.

Figure 7A:
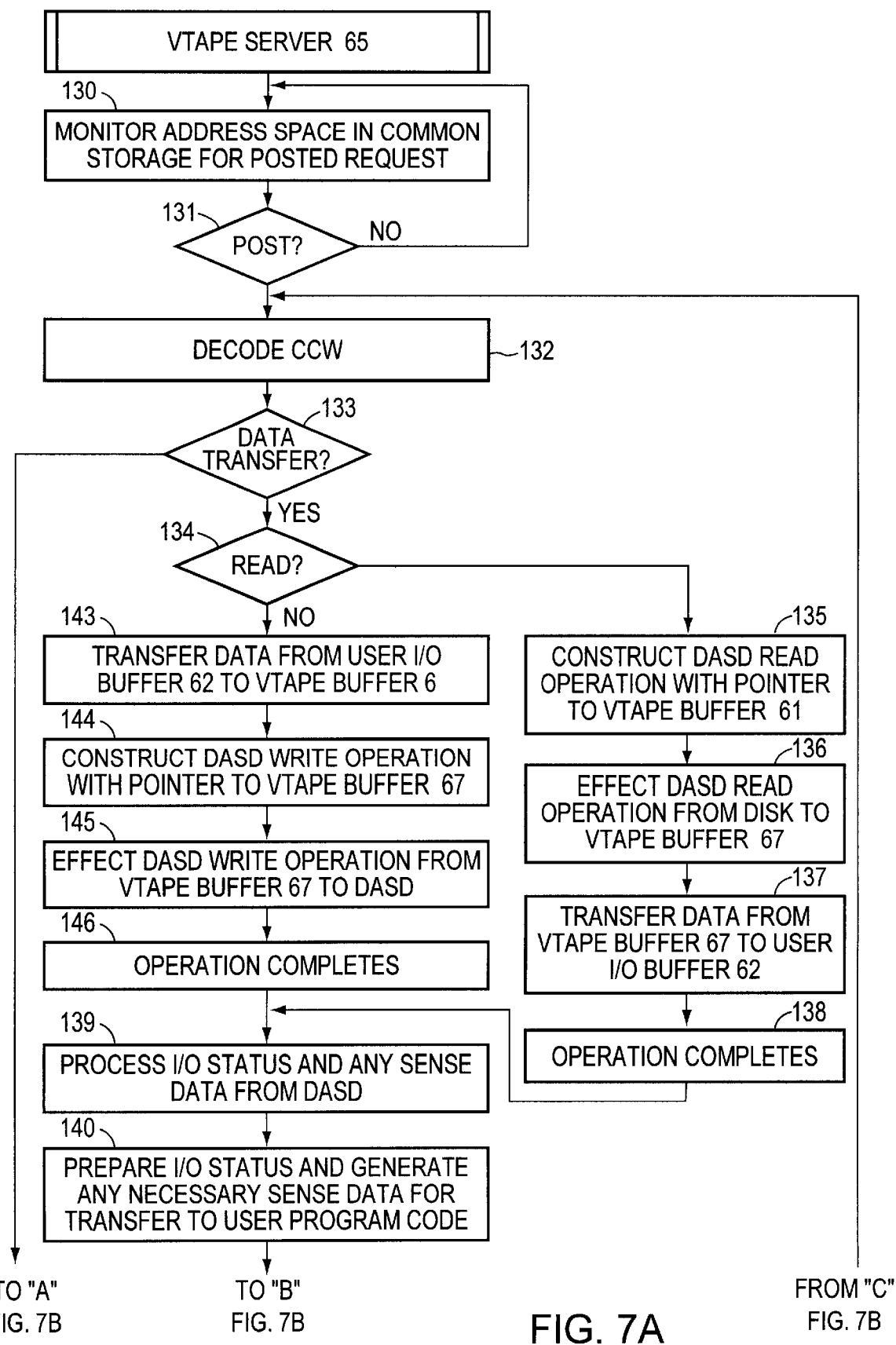
FIGS. 7A and 7B constitute a flow chart depicting the operation on another module shown in FIG. 2.
Figure 7B:
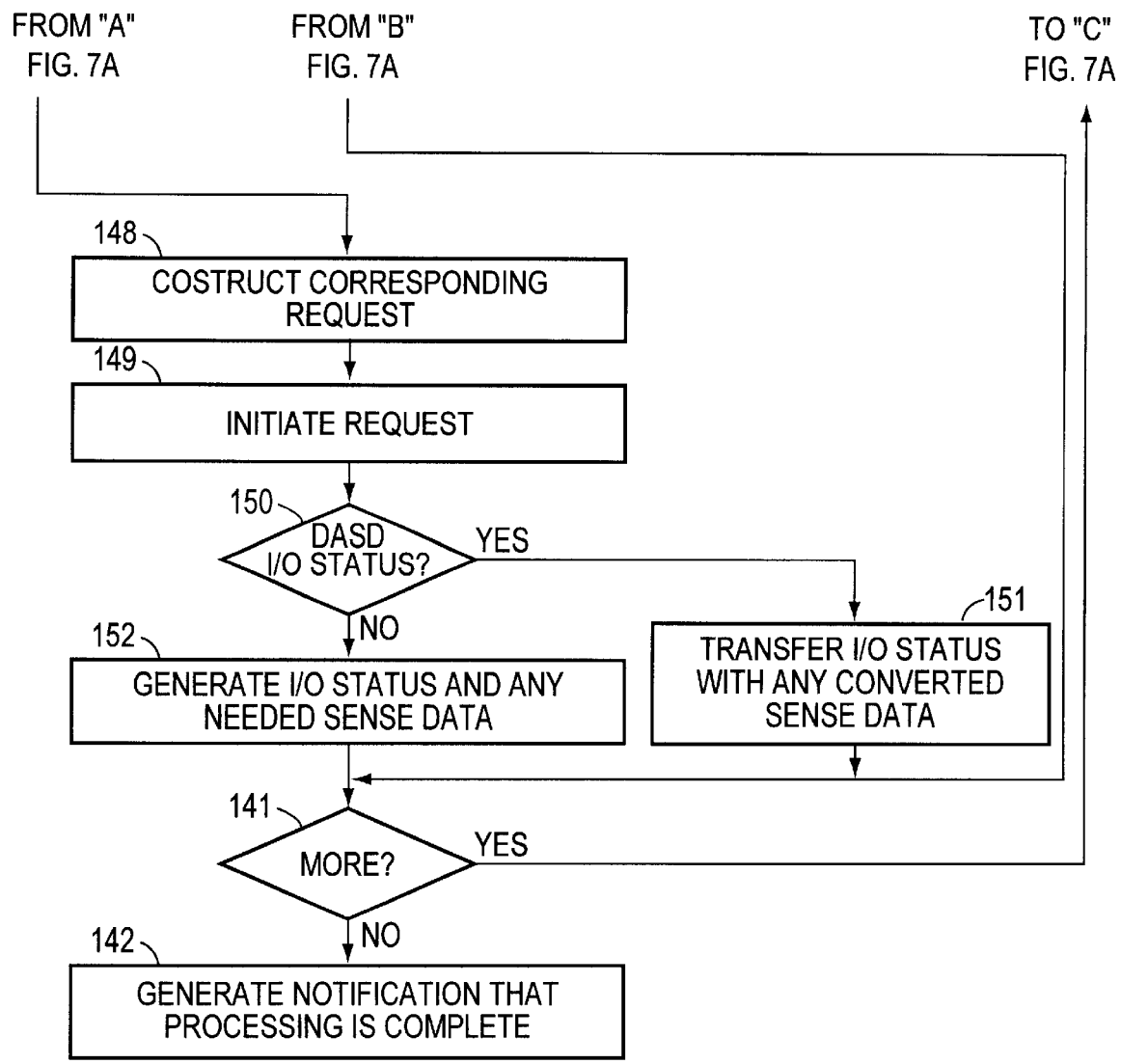

When a tape request identifies a unit in the virtual tape pool, step 90 diverts to step 94 that uses the command converter 66 in the VTAPE server 65 to convert each Channel Control Word in the tape request into one or more Channel Control Words that constitute a "disk request". Disk requests are input-output requests that are recognized by the magnetic disk storage device acting as the virtual tape device. These constitute second requests from a second set of input-output requests. In essence and as described later with respect to FIGS. 7A and 7B, the command converter 66 reformats Channel Control Words in a first tape request for the tape specified in a VTAPE UCB of UCB module 57 to one or more Channel Control Words that constitute a second or disk request for the magnetic disk storage device defined in the VTDISK UCB of UCB module 57.

Once the disk request has been constructed, step 95 posts the request to the VTAPE server 65. Posting a request to a particular application is a conventional MVS procedure for initiating an asynchronous process. Then the EMCSTARTIO module 64 enters a wait state, represented by steps 96 and 97. When the VTAPE server 65 completes the request, it issues a completion modification, as described in greater detail later along with the request status and any sense data. The sense data is in a context of a tape storage device. Steps 96 and 97 then divert operations to step 98 that transfers the status and any sense data to the user program 60 and transfers control back to the user program 60.

Figure 6:
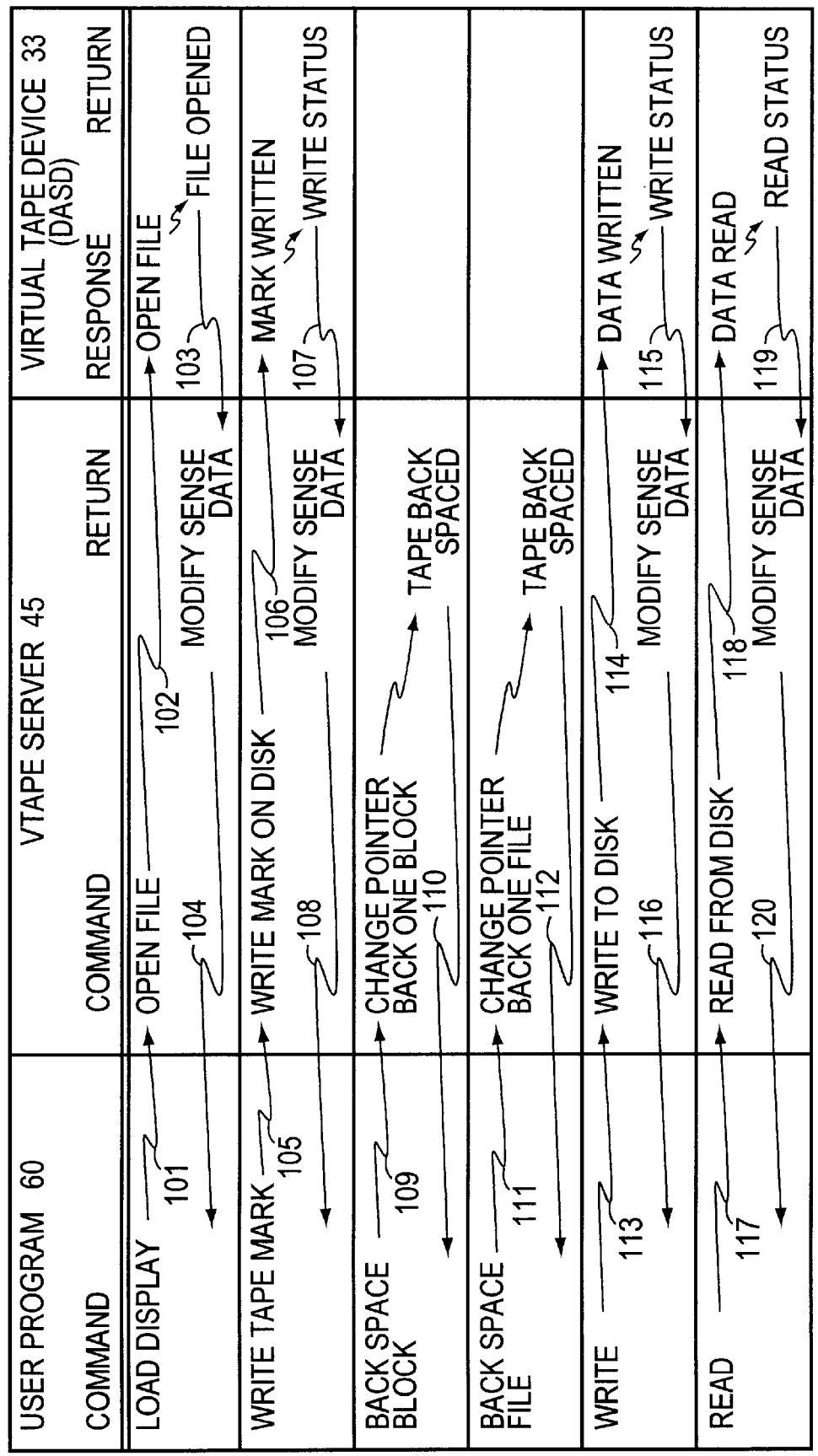
FIG. 6 is a table that defines a correlation between tape requests and disk requests.

FIG. 6 is a table that illustrates the overall operation of the system according to this invention by means of specific examples. Generally, however, each example involves:
1. The transfer of a tape request from the user program 60 to the VTAPE server 65;
2. A response of the VTAPE server 65 that includes the generation of a disk request or other response;
3. The transfer of status from the virtual tape device 33; and
4. The transfer or generation of status for transfer to the user program 60.

With reference to the above listed specific examples, the object of a LOAD DISPLAY tape request is to send a message to an operator at the tape farm to retrieve and place the tape on a drive. When that operation has been completed, a predetermined status may be generated to indicate a successful completion of the request. When the tape unit is a VTAPE unit, the command converter 66 in FIG. 2 receives the LOAD DISPLAY tape request at 101 and responds to this tape request by generating an OPEN FILE disk request that uses the data in the INDEX block 68 of FIG. 2 to provide a file address. The magnetic disk storage device 33 responds to the OPEN FILE disk request at 102 and generates status that indicates whether the file was opened successfully. The VTAPE server 65 then transfers the status from the virtual tape device 33 in step 103 and to the user program 60 in step 104. If the request was not processed successfully, the VTAPE server 65 receives sense data in the context of a disk request at step 103 and performs any necessary modifications to produce sense data having meaning in the context of a tape request for transfer at step 104. Typically the request status passes through the VTAPE server 65 without change.

If a user program 60 generates a WRITE TAPE MARK tape request, step 105 conveys the tape request to the VTAPE server 65 that generates a WRITE disk request. This operation loads predetermined data corresponding to the tape mark at an addressed location on the storage disk (step 106). When the operation is completed, steps 107 and 108 transfer the request status from the magnetic disk storage device to the user program 60 with the VTAPE server modifying any sense data as previously indicated.

The INDEX block 68 in FIG. 2 contains, among other information, pointers to files stored on the magnetic disk storage device. For example, a set of pointers identify the starting addresses for different files and for the preceding and succeeding files. Similar pointers identify the locations of each block.

In step 109 a BACK SPACE BLOCK tape request transfers from the user program 60 to the VTAPE server 65. The VTAPE server 65 sets the pointer with the address of the preceding block using a conventional write operation. Then the VTAPE server 65 generates a request status for return to the user program 60 in step 110. There is no communication with the virtual tape device 33.

Similar activity occurs when the user program 60 generates a BACK SPACE FILE tape request. After receiving the tape request at step 111, the VTAPE server 65 replaces a pointer with the address of the preceding file. At step 112 the VTAPE server 65 generates a request status indicating that the operation is complete and transfers that status and any appropriate sense data to the user program 60. Again, there is no interaction between the VTAPE server 65 and the virtual tape device 33.

When there is no interaction as shown in the foregoing examples, no physical tape movement occurs in the virtual tape unit. Consequently the operation generally completes essentially instantaneously without the time delays involved in conventional tape units where actual tape movement must occur.

When a user program 60 transfers a WRITE tape request to the VTAPE server 60 in step 113, the VTAPE server 65 generates one or more corresponding Channel Control Words for transfer to the magnetic disk storage device in step 114. The status acknowledging the completion of the transfer and any sense data are received at step 115. At step 116 the VTAPE server 65 conveys the request status and converts any sense data into a form that has meaning in the context of the tape request.

A similar process occurs in response to a READ tape request. The VTAPE server 65 receives the tape request at step 117, generates a READ disk request for transfer at step 118. Then it receives the status and any sense data at step 119 and transfers the status with sense data it modifies to the user program 60 at step 120.

The VTAPE server 65 performs similar operations in response to other tape requests. The following discussion defines the actual operations of the VTAPE server 65 including the command converter 66 in greater detail.

As previously indicated, the VTAPE server 65 operates as an asynchronous process. Steps 130 and 131 function to initiate the process whenever the EMCSTARTIO module 64 in FIG. 5 posts a request in step 95. Each posted request is a tape request in the form of one or more Channel Control Words. Step 132 decodes each Channel Control Word in the tape request and generates corresponding Channel Control Words for a disk request.

If a Channel Control Word in a tape request requires a transfer from storage (i.e., a reading operation), step 134 diverts control to step 135 wherein the command converter 66 in the VTAPE server 65 produces the corresponding disk request with one or more Channel Control Words thereby to construct a disk read request to the VTAPE buffer 67. In step 136 the VTAPE server 65 transfers data from addressed portions of the disk to the VTAPE buffer 67. At this point the VTAPE server 65 will also receive the status and any sense data resulting from the operation of the read request. Step 137 uses an MVS facility to transfer the data block from the VTAPE buffer 67 to the user I/O buffer 62. At this point the reading operation completes in step 138.

Step 139 processes the status and any sense data. If sense data is received, the VTAPE server processes that sense data into a form that has meaning in the context of a tape request in step 140 before transferring to step 141 in FIG. 7B to determine if more Channel Control Words need to be processed in the request. Control passes back to step 132 if Channel Control Words need to be processed. When no further Channel Control Words are pending the VTAPE server 65 generates the notification that signals the EMC-STARTIO module to 64 in FIG. 65 at steps 96 and 97.

A WRITE tape request produces analogous steps, but in a slightly different sequence. If a Channel Control Word defines a write request, step 134 transfers control to step 143 thereby moving data from the user I/O buffer 62 to the VTAPE buffer 67. Then step 144 enables the VTAPE server 64 to construct a disk request for the Channel Control Word for a write with a pointer to the VTAPE buffer 67 as the source of the data. Step 145 effects the transfer of data in the VTAPE buffer 67 to the disks. When the operation has been completed at step 145, control passes to step 139 for operations as previously described.

As previously indicated, some tape requests do not involve a data transfer to or from the magnetic disk storage device. When the EMCSTARTIO module 64 processes one of these requests, step 133 in FIG. 7A transfers control to step 140 in FIG. 7 that constructs the corresponding magnetic disk storage device request. Step 149 then initiates the corresponding request. For example, a tape request could request the tape to be positioned at a particular record. As previously stated, the INDEX block 68 in FIG. 2 cross references the locations of each tape record in the disk drive. In a conventional magnetic tape storage device the response time for such a request may take a significant time, measured in seconds, to move to that record. In accordance with this invention, however, it is merely necessary to change a pointer.

Once the request is processed, it is necessary for the VTAPE server 65 to generate or transfer request status and sense data depending upon whether interaction occurred with the virtual tape device. For example, the LOAD DISPLAY and WRITE TAPE MARK requests shown in FIG. 6 produce an interaction with the virtual tape device 33, so that device produces a request status and sense data if necessary. In that case step 150 diverts to step 151 to transfer the status and any sense data from the virtual tape device. For requests not involving interaction, such as the BACK SPACE BLOCK and BACK SPACE FILE tape requests; control passes from step 150 to step 152 whereupon the VTAPE server 65 generates the request status and any necessary sense data for return to the user program 60. Control then passes to step 141 to either complete the process procedure in step 142 or to return control to step 132.

In summary, in accordance with the objects of this invention, the embodiment described with reference to FIGS. 1 through 7B enables a conventional unmodified magnetic disk storage system to respond to conventional tape requests. The operation is transparent to the user. The resulting virtual tape drive utilizes available space in the magnetic disk storage device much more efficiently than in a magnetic tape storage device. Even as each data set transferred to the virtual tape device expires, the tables within MVS will merely indicate that the data is no longer valid. As known, this makes any corresponding space within the magnetic storage device automatically available for subsequent use. There is no need for performing the tedious and time consuming recycle operations of prior art systems. Eliminating recycling operations greatly increases the availability of resources for other, more productive purposes. As the VTAPE server 65 performs the conversion of tape requests to the corresponding data requests and the processing of any returned sense data, this invention is implemented without any requirement for modification to a conventional magnetic disk storage system.

Thus in accordance with this invention there is provided a method and apparatus that enables a conventional magnetic disk storage device to emulate a magnetic tape storage device without modification to any of the hardware, firmware or software assembled with the magnetic disk storage device. Stated differently, the conventional magnetic disk storage device acts as a virtual tape device. This invention has been described in terms of a particular embodiment.

Many modifications can be made. For example, in the disclosed embodiment, data transfers between the USER I/O BUFFER 62 and the VTAPE buffer 67. Other MVS facilities allow alternate approaches to be taken. For example in some applications it may be advantageous to transfer data directly between the virtual tape device 33 and the USER I/O BUFFER 62 in lieu of the involvement for the VTAPE buffer 64. The description defines procedures for handling a single tape request to a virtual tape device. It will be apparent that multiple tape requests may be handled simultaneously by using multiple VTAPE command converters, dispatchers or the like.

In accordance with another aspect of this invention, the only modification to normal control software is the substitution of the ptrEMCSTARTIO pointer for the ptrSTARTIO pointer in location 55. This assures that all the decoding processes occur in the server address space. This, in combination with the various functions of the EMCSVT program, assures a transparent operation. Other implementations might intercept the I/O using a different modality.

The distribution of the components of the VTAPE structure between the common area 50 and private area 51 as shown in FIG. 2 is based upon conventional MVS operating rules. Alternate structures or distributions could be incorporated. The RULE DB module 63 in FIG. 2 has been described with a simple set of rules. The rules could achieve any level of complexity that might be desired for a particular application.

Thus, although this invention has been disclosed in terms of certain embodiments, it will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by letters patent of the united states is:

1. A method for emulating a first data storage device with first characteristics and responsive to individual first requests in a first set of input-output requests with a second data storage device with second characteristics and responsive to individual second requests in a second set of input-output requests wherein a host with a main storage memory and at least one central processor includes means for issuing the first and second requests, said method comprising the steps of:
   A) intercepting in the host each first request from the host,
   B) for each first request that identifies a first storage device being emulated by the second storage device:
      i) building in the host at least one second request according to the characteristics of the second data storage device,
      ii) transferring the at least one second request to the second data storage device from the host
      iii) signalling to the host the completion of each operation initiated by each of the at least one second requests, and,
      iv) signalling to the host, upon the completion of all of the at least one second requests associated with the first request, the completion of the corresponding operation in response to the first request whereby the operation of the second data storage device emulates the operation of the first data storage device and acts as a virtual first data storage device, and
   C) for each first request for other first storage devices transferring the first request and signalling to the host the completion of the operation initiated in response to the first request.

2. A method as recited in claim 1 wherein the first requests include data transfer requests generated by a user program that define a data transfer between the user program and the virtual first data storage device, said step of intercepting requests additionally including responding to the interception of the data transfer requests by defining the data transfer and identifying the location of a data buffer for use in the transfer.

3. A method as recited in claim 2 wherein the user program defines a user program data buffer and said identification of the data buffer location includes identifying the location of the user program data buffer.

4. A method as recited in claim 3 wherein the data transfer request is a read request and said transferring step effects a transfer from the second data storage device to the user program data buffer.

5. A method as recited in claim 3 wherein the data transfer request is a write request and said transferring step effects a transfer from the user program data buffer to the second data storage device.

6. A method as recited in claim 5 wherein said method additionally comprises the step of establishing in the host an index of correspondences between locations in the first and second data storage devices, said method additionally comprising the step of updating the index in response to each write operation thereby to maintain correspondences between the locations of storage locations in the first and second data storage devices.

7. A method as recited in claim 3 wherein said method establishes a second data buffer accessible for the transfer of data and said method additionally comprises the step of transferring data between the user program data buffer and the second data buffer.

8. A method as recited in claim 7 wherein the data transfer request is a read request and said transferring step effects a transfer from the second data storage device to the second data buffer and a transfer from the second data buffer to the user program data buffer.

9. A method as recited in claim 7 wherein the data transfer request is a write request and said transferring step effects a transfer from the user program data buffer to the second data buffer and a transfer from the second data buffer to the second data storage device.

10. A method as recited in claim 9 wherein said method additionally comprises the step of establishing an index that stores the correspondences between locations in the first and second data storage devices, said method additionally comprising the step of updating the index in response to each write operation thereby to maintain correspondences between the locations of storage locations in the first and second data storage devices.

11. A system for emulating a first data storage device with first characteristics responsive individual first requests from a first set of input-output requests with a second data storage device with second characteristics and responsive to individual requests in a second set of input-output requests wherein a host with a main storage memory and at least one central processor includes means for issuing the first and second requests and operates with first and second data storage devices, said system comprising:
   A) means in the host for intercepting each first request from the host,
   B) means for processing a first request for a first storage device being emulated by a second storage device including:
      i) means in the host for building each first request into at least one second request, ii) means for transferring each of the at least one second request to the second data storage device from the host, and iii) means for signalling the completion of an operation initiated by each of the at least one second requests, and iv) means in the host for signalling the completion of the corresponding operation in response to the first request whereby the operation of the second data storage device emulates the operation of the first data storage device, the second data storage device thereby constituting a virtual first data storage device and C) means responsive to each first request for other first storage devices transferring the first request and signalling to the host the completion of the operation initiated in response to the first request.

12. A system as recited in claim 11 wherein the first requests include a first data transfer request generated by a user program that defines a data transfer between the user program and the virtual first data storage device, said means for intercepting requests additionally including means responsive to the interception of the first data transfer request for defining the data transfer and means for identifying the location of a data buffer for use in the transfer.

13. A system as recited in claim 12 wherein the user program defines a data buffer and said means for identifying the data buffer location includes means for identifying the location of said user program data buffer.

14. A system as recited in claim 13 wherein the data transfer request is a read request and said means for transferring includes means for effecting a transfer from the second data storage device to said user program data buffer.

15. A system as recited in claim 13 wherein the data transfer request is a write request and said means for transferring includes means for effecting a transfer from said user program data buffer to the second data storage device.

16. A system as recited in claim 15 wherein said system additionally comprises index means in the host for storing correspondences between locations in the first and second data storage devices, said system additionally comprising means for updating said index in response to each write operation thereby to maintain the correspondences.

17. A system as recited in claim 13 wherein said system establishes a second data buffer accessible for the transfer of data and additionally comprises means for transferring data between the user program data buffer and the second data buffer.

18. A system as recited in claim 17 wherein the data transfer request is a read request and said transferring means includes means for effecting a transfer from said second data storage device to said second data buffer and means for effecting a transfer from said second data buffer to said user program data buffer.

19. A system as recited in claim 17 wherein the data transfer request is a write request and said transferring means includes means for effecting a transfer from said user program data buffer to said second data buffer and means for effecting a transfer from said second data buffer to said second data storage device.

20. A system as recited in claim 19 wherein said system additionally comprises an index means for storing the correspondences between locations in said first and second data storage devices, said system additionally comprising means for updating the index in response to each write operation thereby to maintain the correspondences.

* * * * *

UNITED STATES PATENT AND TRADEMARK OFFICE
CERTIFICATE OF CORRECTION

PATENT NO.    : 6,341,329 B1          Page 1 of 1
DATED         : January 22, 2002
INVENTOR(S)   : Douglas E. LeCrone et al.

It is certified that error appears in the above-identified patent and that said Letters Patent is hereby corrected as shown below:

<u>Title page,</u>
Item [75], Inventors names should read:

--      Douglas E. LeCrone
        Yeshayahu Hess
        Elcana Cohen --

Signed and Sealed this

Twenty-fourth Day of December, 2002

JAMES E. ROGAN
*Director of the United States Patent and Trademark Office*